UNITED STATES PATENT OFFICE.

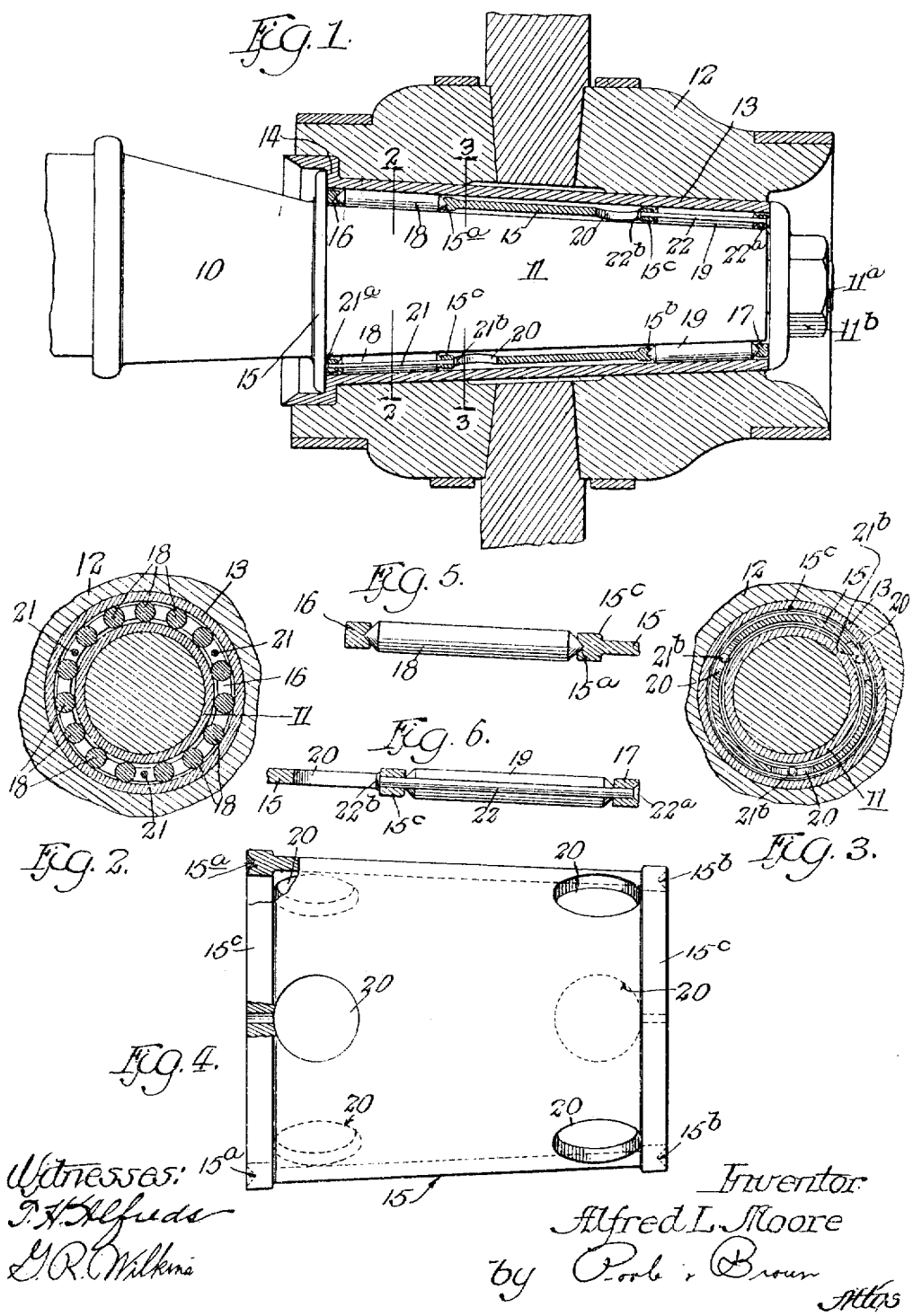

ALFRED L. MOORE, OF MOLINE, ILLINOIS.

ROLLER-BEARING.

944,684.   Specification of Letters Patent.   Patented Dec. 28, 1909.

Application filed July 6, 1909. Serial No. 506,194.

*To all whom it may concern:*

Be it known that I, ALFRED L. MOORE, a citizen of the United States, and a resident of Moline, in the county of Rock Island and State of Illinois, have invented certain new and useful Improvements in Roller-Bearings; and I do hereby declare that the following is a full, clear, and exact description thereof, reference being had to the accompanying drawings, and to the numerals of reference marked thereon, which form a part of this specification.

This invention relates to roller bearings and its object is to provide such a bearing of simple, rigid and economical construction and one in which the lubricant can readily get to all the moving parts so as to reduce the friction to a minimum.

The bearing as illustrated and described herein is applied to the ordinary wagon wheel and this is the most usual instance of its use; but it will be apparent that it may be applied to any wheel which is rotatively mounted upon an axle.

The invention relates to the combination of parts hereinafter more particularly described and specifically pointed out in the claims.

In the drawings:—Figure 1 represents a longitudinal section through the roller bearing. Fig. 2 is a transverse section through Fig. 1 on the line 2—2 thereof. Fig. 3 is a similar section on the line 3—3 of Fig. 1. Fig. 4 is a side elevation of the central shell which forms the support for one end of the rollers. Fig. 5 is a side elevation of one of the rollers showing how it is mounted. Fig. 6 is a section through one end of the central shell and an end ring, showing the connection of the two together.

As shown in said drawings, 10 represents an axle having a spindle 11, on which the hub 12 of the wheel is journaled. The hub 12 is preferably provided with a thimble or skein 13 within which my improved roller bearing is located and against the inner surface of which its rollers bear, the inner sides of the rollers bearing on the spindle. Said thimble is provided at its inner end usually with an annular shoulder 14 which engages an annular flange 15 formed on the axle at the inner end of the spindle 11. The thimble 13, as illustrated, is made conical and the roller bearing is conformed to fit the same, but it is apparent that it may be made cylindrical if desired, the roller bearing being modified accordingly.

The bearing comprises a central shell 15 and end rings 16, 17, by means of which are mounted the sets of rollers 18, 19. The shell 15 is provided with preferably conical sockets $15^a$, $15^b$ at its opposite ends which are there made thicker, as illustrated, to form bearing rings $15^c$.

20 indicates circular openings, a series of which are located at each end of the shell 15 adjacent to the bearing rings $15^c$, said openings being in staggered relation to each other so as not to unduly weaken the shell. These openings serve the double purpose of permitting the grease or other lubricant to pass from the outside of the shell into the space between the shell and the spindle of the axle and of permitting the ready attachment of the end rings to the shell as will now appear. The rings 16 and 17 are secured to the shell 15 by means of rods 21, 22, which rods are provided at one end with heads $21^a$, $22^a$, countersunk in the faces of the rings 16, 17. Their other ends pass through the bearing rings $15^c$ of the shell 15, at the opening 20, where they are upset as indicated at $21^b$, $22^b$, the openings 20 allowing the ends of said rods to be gotten at in order to upset them.

The rollers 19 and 20 are preferably provided with conical bearing points, (as plainly to be seen in Fig. 5) which have bearing in the sockets $15^a$ and $15^b$ in the shell 15 and in similar bearings formed in the rings 16 and 17, in line therewith.

It is apparent from this construction that the parts may be readily assembled, the sets of rollers being first suitably mounted in the sockets, respectively, in the ends of the shell 15 and in the rings 16 and 17, and the rods 21, 22 then passed through the rings 16 and 17 and countersunk therein and the upset heads formed at the other ends thereof at the circular openings 20.

The end of the spindle 11 is provided with a threaded stub $11^a$ on which is screwed a flanged nut $11^b$ by means of which the roller bearing may be drawn up so as to have its inner end bear against the flange 15 on the axle 10. Any wear in the bearings of the rollers may be taken up in this way.

The bearing is greased or lubricated in the usual manner and it is apparent that as the wheel is rotated the grease will work through the openings 20 into the space between the shell and the spindle 11 and then travel toward the rollers and ultimately to the bearings thereof.

As illustrated I have shown each cage supplied with fifteen rollers arranged in sets of five equidistanced apart, and each set of five separated from the adjacent set by a space sufficient for the location and attachment of the rods 21, 22. The two cages are so arranged with respect to each other axially, that the rods 22 are located opposite points half way between the rods 21. In this way the strain of the rings 16 and 17 on the shell, as the wheel is rotated is equally distributed.

While I have shown and described herein certain details of mechanical arrangement and construction it is to be understood that I do not limit myself to them except in so far as pointed out in the claims.

I claim as my invention—

1. A roller bearing comprising a central shell having bearings formed in its opposite ends, and openings formed in the body thereof adjacent the ends, end rings spaced from the opposite ends of said shell provided with bearings, rollers journaled in the bearings of the end rings and in the ends of said shell, and rods adapted to secure said end rings to said shell, said rods having one end countersunk in an end ring and the opposite end projecting into one of said openings in the shell and being there upset.

2. A roller bearing comprising a central shell having bearings formed in its opposite ends, and openings formed in the body thereof adjacent the ends, end rings spaced from the opposite ends of the shell provided with bearings, rollers journaled in the bearings of the end rings and in the ends of said shell, and rods adapted to secure said end rings to said shell, each of said rods having a head at the end passing through the end ring and having its other end projecting into one of said openings in the shell.

3. A roller bearing comprising a central shell having bearing rings formed at each end, and having openings formed in the body thereof adjacent said bearing rings, end rings spaced from the opposite ends of said shell, rollers journaled in said end rings and in the bearing rings of said shell, and rods adapted to secure the end rings to said shell, said rods having a head at one end and being projected at the other end through the bearing rings of said shell into one of said openings in said shell.

4. A roller bearing comprising a central shell having openings formed in the body thereof adjacent its ends, end rings spaced from the opposite ends of said shell, rollers retained between said end rings and said shell, rods adapted to secure said end rings to said shell, said rods passing through said end rings and projecting through the ends of said shell into the openings thereof, and means for retaining said rods in place.

5. A roller bearing comprising a central shell having openings formed in the body thereof adjacent its ends, end rings spaced from the opposite ends of said shell, rollers retained between said end rings and said shell, rods adapted to secure said end rings to said shell, said rods passing through said end rings and projecting through the ends of said shell into the openings thereof and having a countersunk head in the rings and an upset head at their opposite ends.

6. A roller bearing comprising a central shell having bearing rings formed at each end and having openings formed in the body thereof adjacent its ends, end rings spaced from the opposite ends of said shell, rollers retained between said end rings and said shell, rods adapted to secure said end rings to said shell, said rods passing through said end rings and projecting through the ends of said shell into the openings thereof and having a countersunk head in the rings and an upset head at their opposite ends.

In testimony that I claim the foregoing as my invention I affix my signature in the presence of two witnesses, this 25th day of June A. D. 1909.

ALFRED L. MOORE.

Witnesses:
GEORGE L. BRUMBAUGH,
F. N. SCHROENEKER.